United States Patent
Grote et al.

(10) Patent No.: US 6,782,166 B1
(45) Date of Patent: Aug. 24, 2004

(54) OPTICALLY TRANSPARENT ELECTRICALLY CONDUCTIVE CHARGE SHEET POLING ELECTRODES TO MAXIMIZE PERFORMANCE OF ELECTRO-OPTIC DEVICES

(75) Inventors: James G. Grote, Yellow Springs, OH (US); Robert L. Nelson, Springfield, OH (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 89 days.

(21) Appl. No.: 10/185,844

(22) Filed: Jul. 1, 2002

Related U.S. Application Data

(60) Provisional application No. 60/344,834, filed on Dec. 21, 2001.

(51) Int. Cl.[7] ................................................. G02B 6/26
(52) U.S. Cl. ................................ 385/40; 385/2; 385/8; 385/131
(58) Field of Search .............................. 385/2, 3, 8, 37, 385/40, 122, 129–132

(56) References Cited

U.S. PATENT DOCUMENTS

| 4,887,884 A | | 12/1989 | Hayden ........................ 385/14 |
| 5,282,078 A | | 1/1994 | Horsthuis .................... 359/328 |
| 5,283,685 A | | 2/1994 | Horsthuis .................... 359/332 |
| 5,289,308 A | | 2/1994 | Horsthuis et al. ........... 359/328 |
| 5,594,093 A | | 1/1997 | Sotoyama et al. .......... 528/353 |
| 5,887,116 A | * | 3/1999 | Grote ............................. 385/2 |
| 5,892,859 A | | 4/1999 | Grote ............................. 385/2 |

* cited by examiner

*Primary Examiner*—Phan T. H. Palmer
(74) *Attorney, Agent, or Firm*—Gina S. Tollefson; Gerald B. Hollins; Thomas L. Kundert

(57) ABSTRACT

A non-liner electron-optic polymer based, integrated optic, electron-optic device utilizing a non-liner electron-optic polymer for the optical wave guide core layer sandwich between two very thin optically transparent electrically conductive charge sheet poling electrode layers which are, in turn, sandwiched between two electrically passive polymer optical wave guide cladding layers.

19 Claims, 5 Drawing Sheets

OPTICALLY TRANSPARENT ELECTRICALLY CONDUCTIVE CHARGE SHEET POLING ELECTRODES TO MAXIMIZE PERFORMANCE OF ELECTRO-OPTIC DEVICES

This application claims benefit of U.S. Provisional Appl. No. 60/344,834 filed Dec. 21, 2001.

RIGHTS OF THE GOVERNMENT

The invention described herein may be manufactured and used by or for the Government of the United States for all governmental purposes without the payment of any royalty.

BACKGROUND OF THE INVENTION

As optical data processing circuits approach multigigahertz operation rates, the need arises for high-speed optical interconnects for signal transmission and routing. This requires high-speed electro-optic modulators and switches that convert the electronic signal to optical. The electronic circuits that drive the electro-optic modulators and switches provide low voltage levels at high speeds. This dictates the performance goals required for the electro-optic modulators and switches. Currently employed electro-optic modulators and switches have drive voltages much too large for high-speed operation.

Electro-optic modulation or switching is represented generally in the top view drawing of FIGS. 1a and 1b. As the basic form of an electro-optic switch, the directional coupler, shown in FIGS. 1a and 1b is known, with FIG. 1a showing a switch without applied drive or modulation or switching voltage and FIG. 1b showing a switch with applied drive or modulation or switching voltage. A directional coupling type of electro-optic switch is one that controls the transfer of the optical signal by causing the, index of refraction of the switch's coupling portion to change by an electro-optic effect. The FIG. 1a top view illustrates a switch having wave guides etched from a wafer including a layer of non-linear electro-optic polymer material.

Parallel channel wave guides separated by a finite distance for receiving one or more optical signals are represented in both FIGS. 1a and 1b at 101, 102 and 112 and 113, respectively. A single optical input signal is considered for purposes of the present discussion and is represented by the bold arc at 103 and 114 in FIGS. 1a and 1b, respectively. A symmetric mode of the optical signal, as represented at 105, and an antisymmetric mode of the optical signal as represented at 104 in FIG. 1a and at 116 and 115 in FIG. 1b, respectively, are generated upon entering the switch and these modes travel along the length of the channel or switch, over such lengths as are represented at 106 and 121 in FIGS. 1a and 1b respectively. The phase of the two modes shift as the respective signals travel the length of the wave guides, as is represented in the dotted, curved lines, shown at 108 In FIG. 1a and at 119 in FIG. 1b and the solid, curving lines shown at 107 and 120 in FIGS. 1a and 1b, respectively. The symmetric mode is the mode of propagation within the other wave guide region. With no voltage applied to the FIG. 1 switches, complete transfer of light from one channel to the next occurs at a distance that introduces a voltage independent π/2 phase shift to the modes so that the one mode couples completely to the other. Complete mode coupling and light transfer occurs at the output wave guides at 126 in FIG. 1a and thereafter the complete optical signal at 111 exits the wave guide at 128 in FIG. 1a.

Applying an electric field to one of the channels of the directional coupler of FIG. 1b over the distance L represented at 121 from the voltage source shown at 122 in FIG. 1b will alter the dielectric properties of the coupler's non-linear polymer material subjected to the electric field, hence changing the index of refraction of the material and introducing a voltage dependent π/2 phase shift in the signal modes 115 and 116 and thereby modulation or switching the wave guide from 129 to 130 through which the signal exits as represented at 125 in FIG. 1b.

Past research has focused on exploiting the electro-optic properties of non-linear electro-optic polymers with optimized optical, structural and mechanical properties to achieve high performance electro-optic devices, such as modulators and switches. Non-linear electro-optic polymers have several attractive potential characteristics that many researchers have tried to capitalize on over the past decade. These include a high non-linearity or electro-optic coefficient enabling potential low voltage operation. a low dielectric constant for high speed modulation, low temperature processing enabling integration of optics with electronics, excellent refractive index match with optical fiber materials and simplified fabrication for lower cost.

Several technical barriers have heretofore prevented the use of non-linear electro-optic polymers from progressing toward commercialization thus far. Breakthroughs in the development of non-linear electro-optic polymers over the last couple of years have demonstrated 100+pm/V electro-optic coefficients for potential low voltage electro-optic device operation. This has led to a recently reported milestone of less than 1 Volt operation voltage. However, even though device modulation and modulation or switching voltages have been dramatically reduced by utilizing these new materials, the resulting modulation or switching voltages are still much higher than required for high speed operation.

In considering modulation and modulation or switching voltages, one must first determine those parameters that affect modulation voltage for electro-optic devices. The voltage necessary to realize the desired π phase retardation for a conventional transverse electro-optic modulator is defined as the half wave voltage Vπ and is given by $$V_\pi = \frac{\lambda d}{n^3 r_{33} l}, \quad (1)$$

where λ is the wavelength, d is the thickness of the electro-optic material, n is the index of the electro-optic material, $r_{33}$ is the electro-optic coefficient of the electro-optic material and 1 is the length of the interaction region. For a given geometry, Vπ will be inversely proportional to the electro-optic coefficient $r_{33}$. Thus, it is desired to maximize $r_{33}$ in order to minimize $V_\pi$ Now, the value for $r_{33}$ is determined by previous application of a large poling field across the active polymer film when heated to near its transition temperature $T_g$ and then allowed to cool to room temperature while keeping the electric field applied. This poling field is chosen to be as large as possible, yet just less than that which would result in dielectric breakdown of the material.

However, practical non-linear electro-optic polymer based electro-optic modulators and switches require polymer cl adding layers in addition to the non-linear electro-optic polymer core in order to confine the optical signal within the core region. The cladding layers control how much poling voltage is dropped across the core region and thus controls the non-linearity or electro-optic coefficient $r_{33}$. The present invention overcomes the barriers to commercial use of non-linear electro-optic polymers by maximizing the poling efficiency of and in-turn maximizing the electro-optic coefficient of non-linear electro-optic polymer materials making up the core layer within an electro-optic wave guide device structure that includes cladding layers and conductive charge sheet layers. The present invention will render lower operating voltages, shorter device lengths and also reduce optical propagation loss.

SUMMARY OF THE INVENTION

The present invention provides a non-linear electro-optic polymer based, integrated optic, electro-optic device utilizing a non-linear electro-optic polymer for the optical wave guide core layer sandwiched between two very thin optically transparent electrically conductive charge sheet poling electrode layers which are, in turn, sandwiched between two optical wave guide cladding layers.

It is an object of the present invention to provide a non-linear electro-optic polymer based, integrated optic, electro-optic device having a maximized electro-optic coefficient.

It is another object of the present invention to provide a non-linear electro-optic polymer based, integrated optic, electro-optic device having minimized device operating voltages.

It is another object of the invention to provide a non-linear electro-optic polymer based, Integrated optic, electro-optic device having maximized realizable device speed.

It is another object of the invention to provide a non-linear electro-optic polymer based, integrated optic, electro-optic device having maximized poling efficiency, which will also render the lowest possible poling voltage, making it possible to pole the devices in-situ within electronic circuits.

It is another object of the invention to provide a non-linear electro-optic polymer based, integrated optic, electro-optic device having extended life and usefulness beyond known devices.

It is another object of the invention to provide a non-linear electro-optic polymer based, integrated optic, electro-optic device having minimized optical propagation loss induced by the drive electrodes.

These and other objects of the invention are achieved by the description, claims and accompanying drawings and by a minimal propagation loss, electro-optic coefficient maximizing electrically controlled polymer-based optical signal modulation and switching device requiring minimal operating voltage comprising:

a first electrically grounded metal layer overlaying said substrate layer and functioning as an electrical ground electrode;

a first electrically passive polymer cladding layer overlaying said first metal layer and including therein an aperture communicating with said grounded metal layer;

a first optically transparent electrically conductive charge sheet layer overlaying said first electrically passive polymer cladding layer, said first optically transparent electrically conductive charge sheet layer including an integral portion extending through said aperture of said first electrically passive polymer cladding layer and making electrical contact with said first electrically grounded metal layer;

an optical signal transmitting non-linear electro-optic polymer core layer having electrically alterable molecular structure and optical refraction properties;

a second optically transparent electrically conductive charge sheet layer overlaying said optical signal transmitting non-linear electro-optic polymer core layer, said first and second optically transparent electrically conductive charge sheet layers being capable of establishing an electric field region encompassing said optical signal transmitting non-linear electro-optic polymer core layer in said modulation or switching device;

a second electrically passive polymer cladding layer overlaying said second optically transparent electrical conductive charge sheet layer; and a second metal layer overlaying said second electrically passive polymer cladding layer and interfacing a switch controlling electrical signal voltage source with said second optically transparent electrically conductive charge sheet layer through said second electrically passive polymer cladding layer;

said non-linear electro-optic polymer core layer transmitting an optical signal in a predictably altered path therein upon application of electric field-sustaining voltage between said first and second optically transparent electrically conductive charge sheet layers.

BRIEF DESCRIPTION OF THE DRAWINGS

FIG. 2b shows an equivalent electrical circuit of the non-linear electro-optic polymer based electro-optic wave guide device of FIG. 1a.

DETAILED DESCRIPTION

Figure 1A:
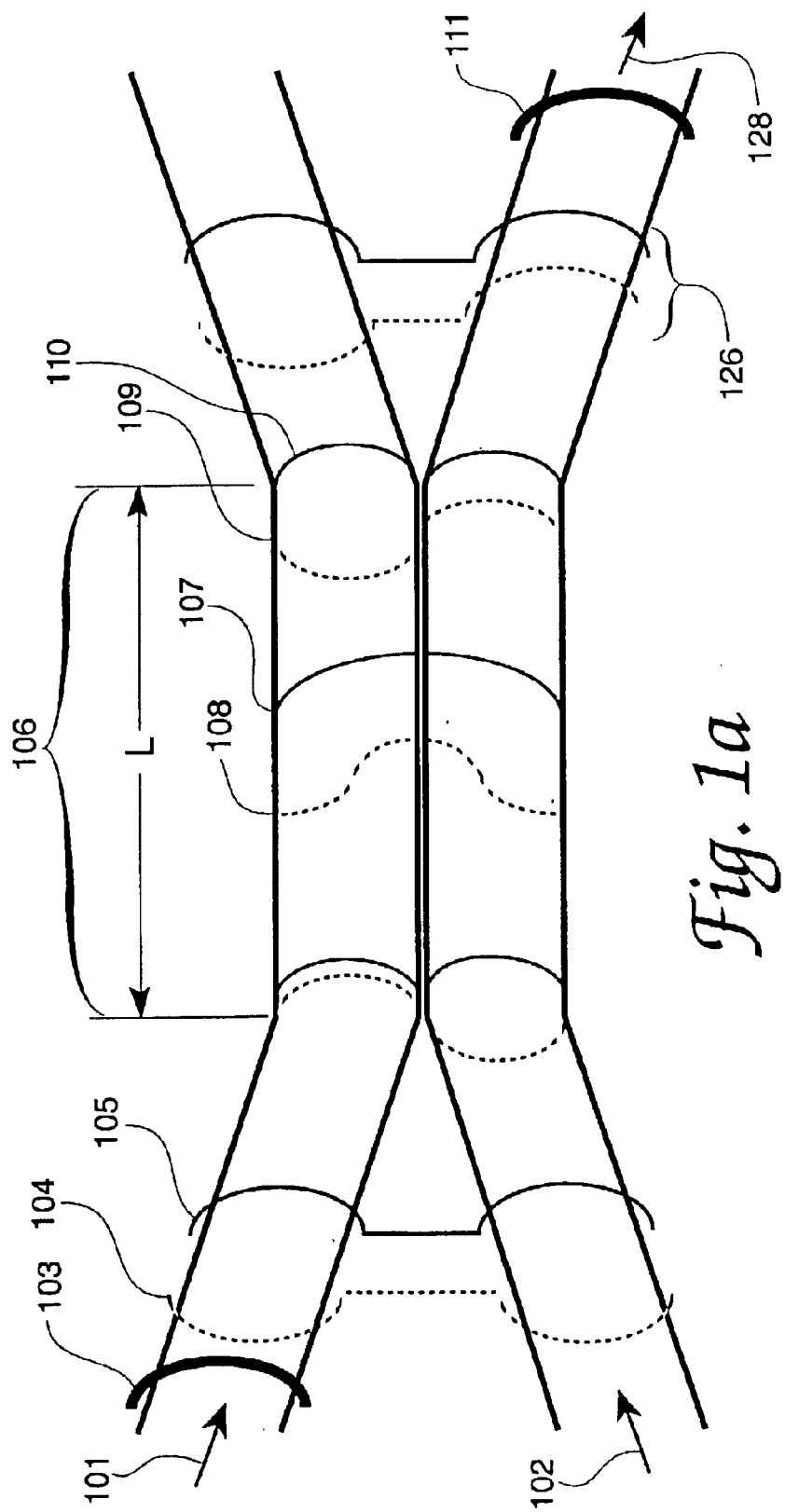
FIG. 1a shows a top view of a conventional transverse electro-optic directional coupler modulation or switching device.
Figure 1B:
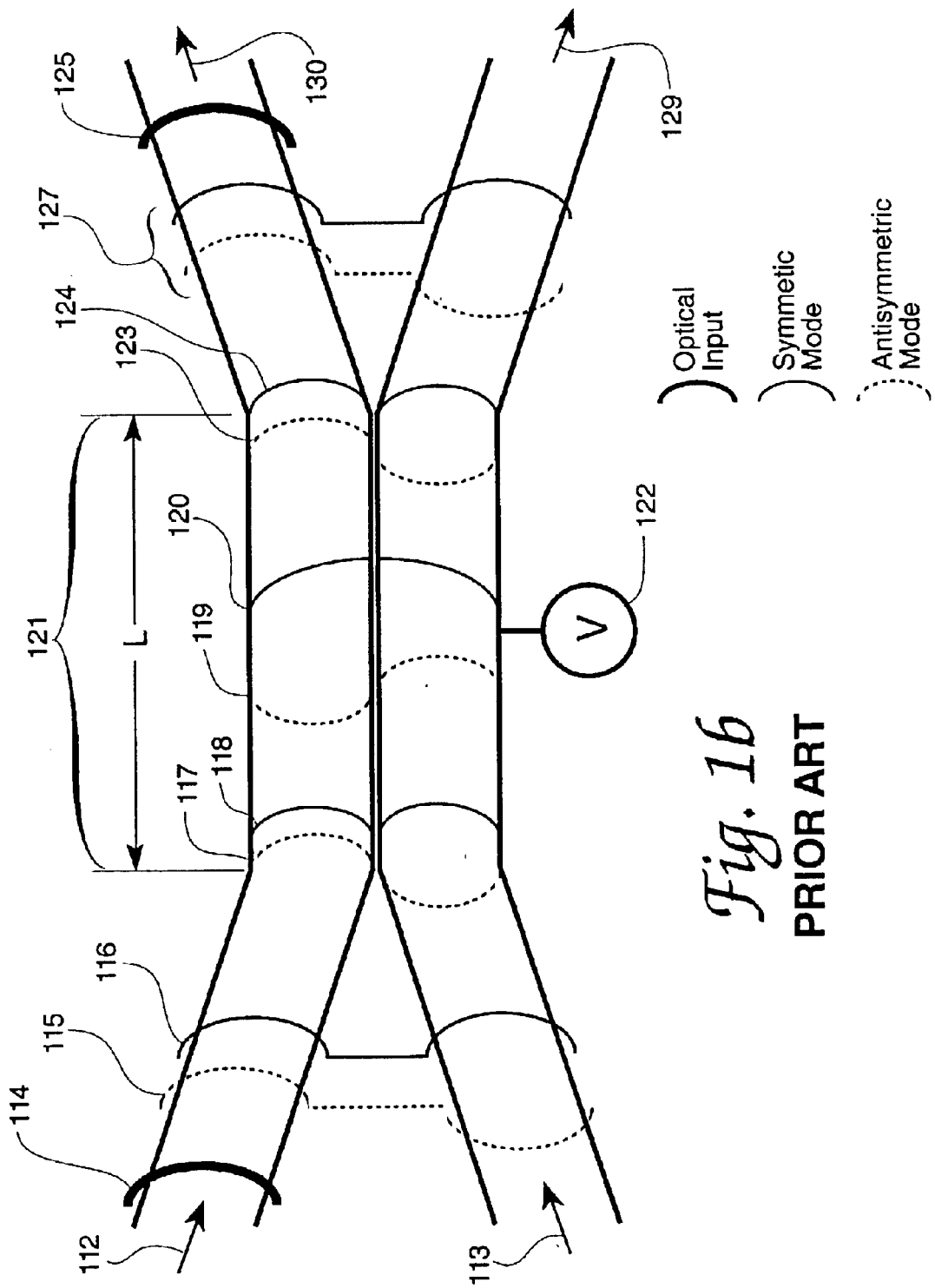
FIG. 1b shows a top view of a conventional transverse electro-optic directional coupler modulation or switching device with an applied modulation or switching voltage.
Figure 2A:
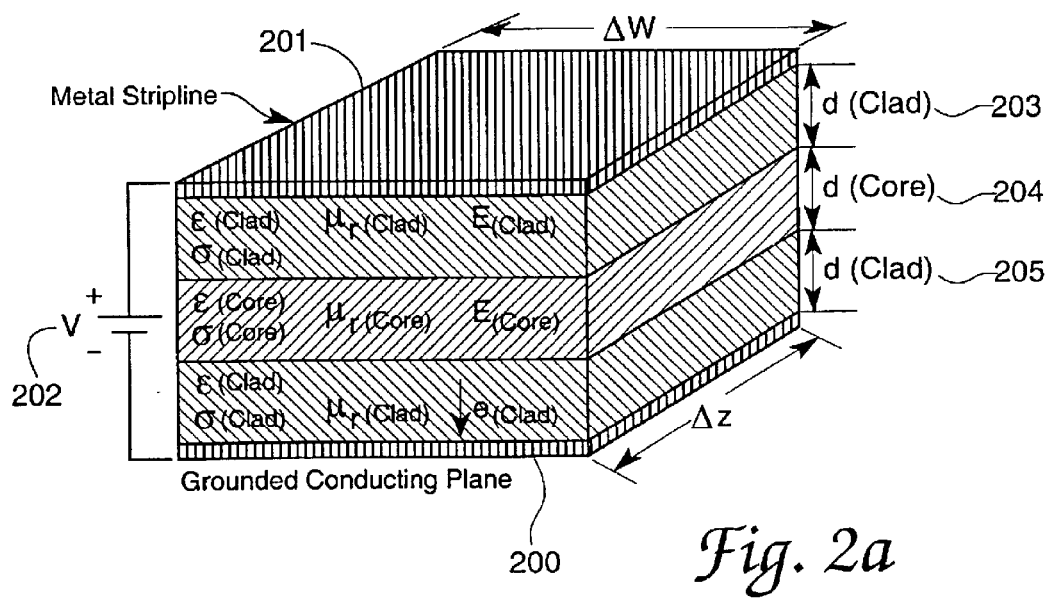
FIG. 2a shows a non-linear electro-optic polymer based electro-optic wave guide device.

When fabricating the electro-optic device of the invention, one introduces two passive polymer cladding layers in addition to the non-linear optical polymer core layer. The poling field is no longer dropped across the non-linear optical polymer alone, but across two cladding layers as well. To determine how much of the electric field is being dropped across the core material in this 3-layer wave guide structure, we must consider the relative thickness', conductivities, permeabilities and permittivities of the core and cladding layers. FIG. 2 illustrates such conductivities, permeabilities and permittivities of the core and cladding layers. FIG. 2a shows a diagram of an electro-optic device with the core layer shown at 204, the cladding layers shown at 203 and 205, the grounded conducting plane shown at 200, the metal strilpline shown at 201 and voltage drop across the device represented at 202.

Figure 2B:
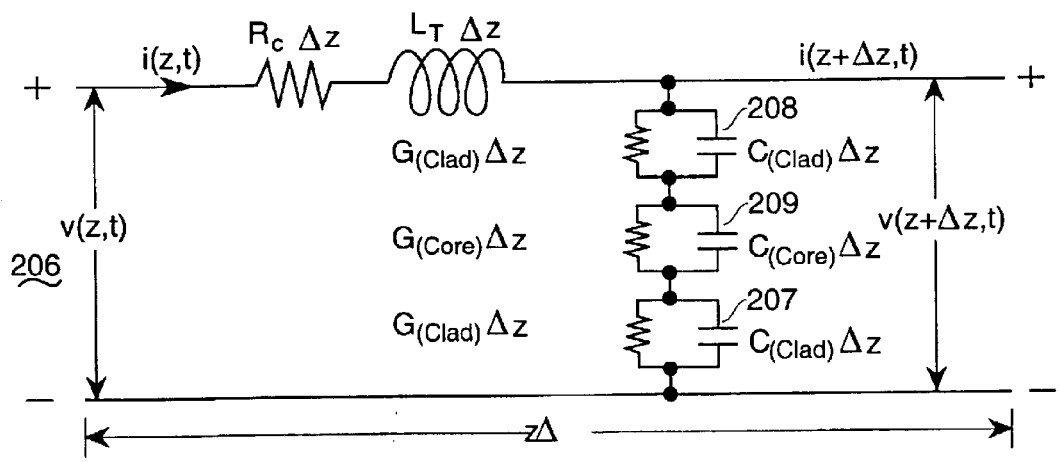

FIG. 2b shows an equivalent electrical circuit of a non-linear electro-optic polymer based electro-optic wave guide device. The voltage drop across the circuit Is represented at 206, the core component Is represented at 209 and the cladding components are represented at 207 and 208.

As an example, consider a structure made up of a 2 μm thick non-linear electro-optic polymer core and two 3 μm thick passive polymer claddings. We wish to drop a poling field of 150 V/μm across the non-linear electro-optic polymer core in order to maximize $r_{33}$. Poling is a static condition, so we need only consider the relative thicknesses and conductivities of the core and cladding materials. If we assume that the conductivities of the core and cladding materials are the same for a 3-layer wave guide structure, then we should be able to apply 1200 VDC to drop 300V, or 150 V/μm, across the non-linear electro-optic polymer core and, thus, realize a maximum $r_{33}$. However, if this were the case, then we would see much lower modulation or switching voltages for the non-linear electro-optic polymer devices than have been reported.

Figure 3:
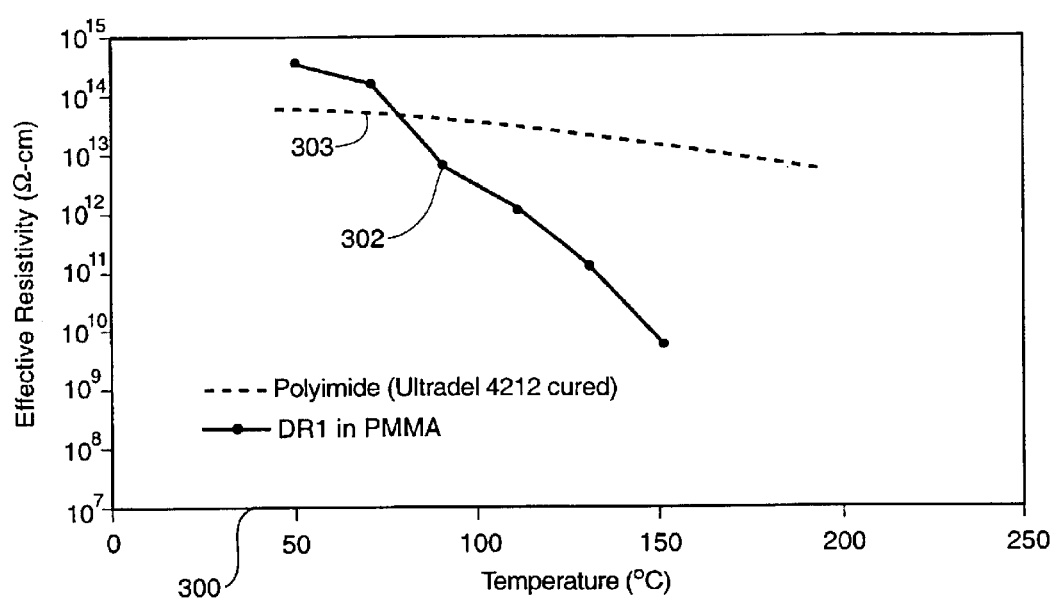
FIG. 3 shows a graph of effective resistivity versus temperature for 10 wt % DR1 in PMMA nonlinear electro-optic polymer and Ultradel 12 polymide passive polymer.

Actually, it has been observed that the conductivity of a typical non-linear electro-optic polymer core material, such as disperse red one (DR1) dye in poly methyl methacrylate (PMMA), and the conductivity of a typical passive polymer cladding material, such as Ultradel 4212 polyimide, vary differently from one another with respect to temperature. FIG. 3 illustrates this observation. In FIG. 3, the x-axis at 300 represents temperature and the y-axis at 301 represents effective resistivity. FIG. 3 shows that at the poling temperature for DR1 in PMMA, 90° C. shown at 302, the resistivity of polyimide, shown at 303, is one order of magnitude higher than that of DR1 in PMMA.

Let us then assume a standard ohmic voltage divider, the proposed core poling voltage is given by $$Vp_{Core} = Vp_{Total} \cdot \left[ \frac{\rho_{Core}}{\rho_{Core} + 2 \cdot \rho_{Clad} \cdot \left(\frac{d_{Clad}}{d_{Core}}\right)} \right]. \quad (2)$$

where $Vp_{Core}$ is poling voltage across the core, $Vp_{Total}$ is the total applied poling voltage, $\rho_{Core}$ and $\rho_{Clad}$ are the resistivities of the core and cladding materials and $d_{Core}$ and $d_{Clad}$ are the thickness of the core and cladding materials, respectively. Clearly in a single layer film, $d_{Clad}=0$, so $Vp_{Core}=Vp_{Total}$. In the 3-layer case, $Vp_{Core}=Vp_{Total}$ when $\rho_{Core} \gg \rho_{Clad}$. Thus, in order to maximize the poling field and thus the value of $r_{33}$ for this 3-layer wave guide structure, we need to either find cladding materials, which have significantly lower resistivities (higher conductivities) than those of the core material, which could also render higher optical propagation loss, or we need to find a new scheme to drop all the poling voltage across the NLO core material without introducing any additional optical propagation loss. The present invention provides one such arrangement utilizing optically transparent electrically conductive charge sheet poling electrodes that can provide the electric field required and the optical propagation loss desired.

Figure 4:
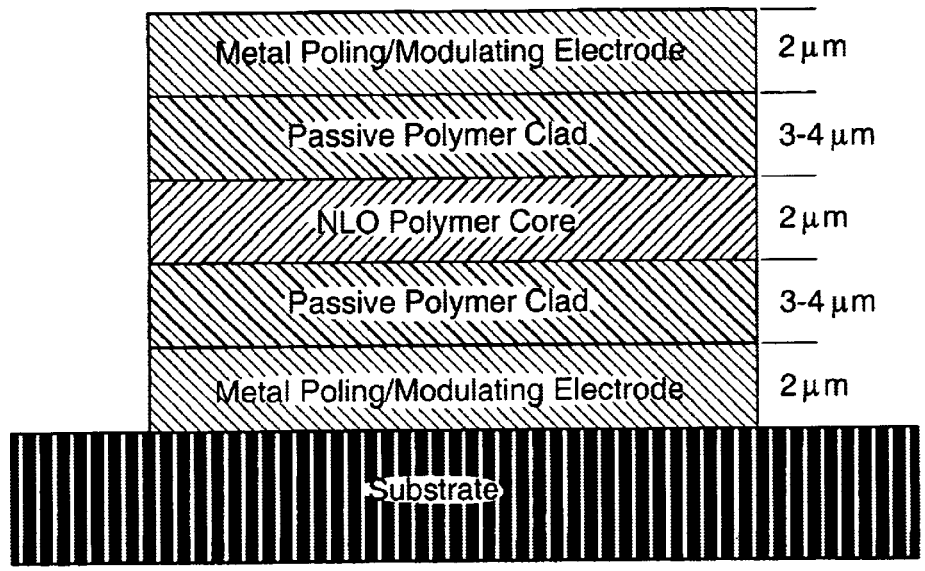
FIG. 4 shows an end view of a conventional non-linear electro-optic polymer based electro-optic device.

The current way of fabricating non-linear electro-optic polymer OE switches is to sandwich the cladding and core layers between metal electrodes. One starts off with a thin (2 μm) metal layer deposited onto a substrate, followed by a 3–4 μm layer of passive polymer cladding layer, followed by a 2 μm non-linear electro-optic polymer core layer, followed by a 3–4 μm passive polymer cladding layer, followed by a thin (2 μm) metal layer. See FIG. 4. The thicknesses for the core and cladding layers are chosen to minimize the optical propagation loss.

Figure 5:
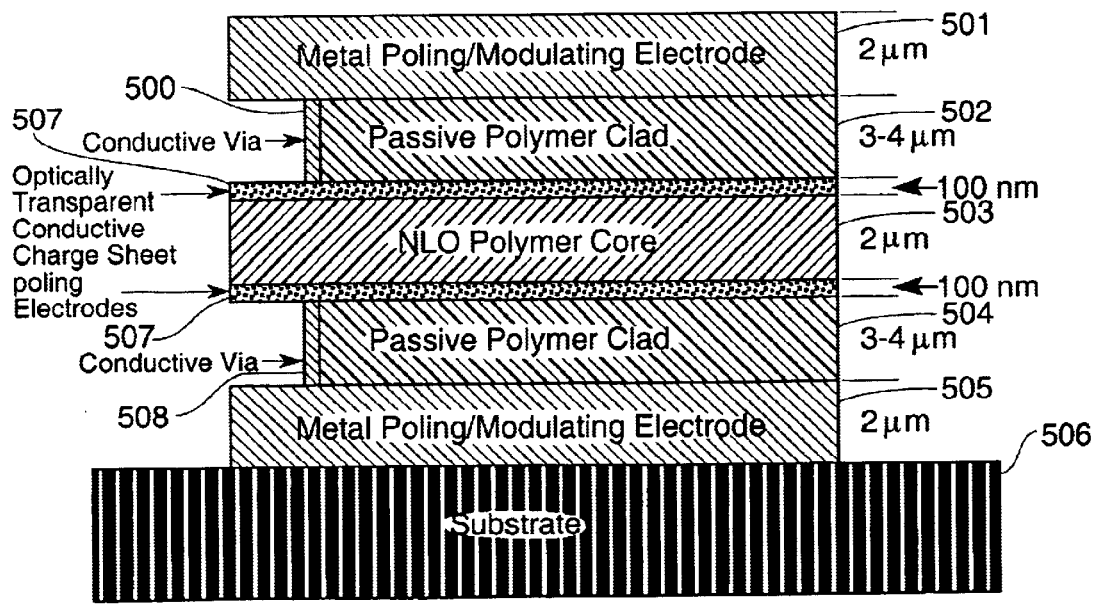
FIG. 5 shows an end view of a non-linear electro-optic polymer based electro-optic device utilizing optically transparent electrically conductive charge sheet poling electrodes.

The passive polymer cladding layers have a slightly lower refractive index than the core layer. The top and bottom metal electrodes are typically gold. They are used to both initially pole the non-linear electro-optic polymer material and to provide voltage for modulation and modulation or switching. Poling is what renders the materials non-linear properties. One of the benefits of the present invention is that the voltage required for poling the device prior to operation is reduced. Electric field poling is used to achieve a macroscopic alignment of chromophores or a "doping" of the core polymer material responsible for the electro-optic effect in non-linear electro-optic polymers From bottom to top, the optical modulation or switching device of the present invention comprises a substrate, a metal layer, an electrically passive polymer cladding layer, an optically transparent electrically conductive charge sheet layer, a non-linear electro-optic polymer core layer, a second optically transparent electrically-conductive charge sheet layer, a second electrically passive polymer cladding layer and a second metal layer. In contrast, a conventional non-linear electro-optic polymer modulation or switching device fabricated on a substrate includes a metal layer, an electrically passive polymer cladding layer, a non-linear electro-optic polymer core layer, a second electrically passive polymer cladding layer and a second metal layer. The present invention places a thin, optically transparent electrically conductive charge sheet material between the non-linear electro-optic polymer core and electrically passive optical wave guide cladding layers. Such an arrangement Is shown in FIG. 5. The desired thickness of the optically transparent electrically conductive charge sheet layers, shown at 507, should be much less than the wavelength of light used for the device, typically less than 100 nm, to ensure minimum optical propagation loss. The optically transparent electrically conductive charge sheet material can either be a metal, a semiconductor, a ferroelectric or a conductive polymer. The conductivity should be at least 3 orders of magnitude greater than that of the non-linear electro-optic polymer core material, shown at 503, to ensure the maximum poling efficiency. A conductive via, shown at 500, using a metal or a conductive polymer, can be utilized to make either a temporary or permanent contact between the top and bottom metal modulating electrodes and at 508, the top and bottom optically transparent electrically conductive charge sheet layers, for poling. After poling, the optically transparent electrically conductive charge sheet layers, shown at 507, can either be left connected with the metal modulating electrodes, shown at 501 and 505, for slow speed modulation or switching applications, or disconnected from the metal modulating electrodes, 501 and 505, for high speed modulation or switching applications, so as not to interfere with the high-speed operation.

The present invention provides a commercially attractive arrangement for integration of an optical modulation or switching device into an integrated circuit chip. The invention provides for a non-linear electro-optic polymer for an optical wave guide core layer sandwiched between two very thin optically transparent electrically conductive charge sheet poling electrode layers which are, in turn, sandwiched between two electrically passive polymer optical wave guide cladding layers.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A minimal propagation loss, electro-optic coefficient maximizing electrically controlled polymer-based optical signal modulation and switching device requiring minimal operating voltage comprising:
   a first electrically grounded metal layer overlaying a substrate layer and functioning as an electrical ground electrode;
   a first electrically passive polymer cladding layer overlaying said first metal layer and including therein an aperture communicating with said grounded metal layer;
   a first optically transparent electrically conductive charge sheet layer overlaying said first electrically passive polymer cladding layer, said first optically transparent electrically conductive charge sheet layer including an integral portion extending through said aperture of said first electrically passive polymer cladding layer and making electrical contact with said first electrically grounded metal layer;
   an optical signal transmitting non-linear electro-optic polymer core layer having electrically alterable molecular structure and optical refraction properties;
   a second optically transparent electrically conductive charge sheet layer overlaying said optical signal transmitting non-linear electro-optic polymer core layer, said first and second optically transparent electrically conductive charge sheet layers being capable of establishing an electric field region encompassing said optical signal transmitting non-linear electro-optic polymer core layer in said modulation or switching device;
   a second electrically passive polymer cladding layer overlaying said second optically transparent electrical conductive charge sheet layer; and
   a second metal layer overlaying said second electrically passive polymer cladding layer and interfacing a switch controlling electrical signal voltage source with said second optically transparent electrically conductive charge sheet layer through said second electrically passive polymer cladding layer;
   said non-linear electro-optic polymer core layer transmitting an optical signal in a predictably altered path therein upon application of electric field-sustaining voltage between said first and second optically transparent electrically conductive charge sheet layers.

2. The minimal propagation loss, electro-optic coefficient maximizing electrically controlled polymer-based optical signal modulation and switching device requiring minimal operating voltage of claim 1, wherein said first and second optically transparent electrically conductive charge sheet poling electrode layers are comprised of a metal from the group consisting of gold and silver, and a ferroelectric compound from the group consisting of lithium niobate and barium titanate, and a conductive polymer from the group consisting of poly(ethylene dioxythiophene) and hydrochloric acid doped poly(anilene).

3. The minimal propagation loss, electro-optic coefficient maximizing electrically controlled polymer-based optical signal modulation and switching device requiring minimal operating voltage of claim 2, wherein a thickness dimension of each of said first and second optically transparent electrically conductive charge sheet poling electrode layers is less than 100 nanometers.

4. The minimal propagation loss, electro-optic coefficient maximizing electrically controlled polymer-based optical signal modulation and switching device requiring minimal operating voltage of claim 2, wherein said optical signal transmitting polymer core layer has a thickness of one to three microns.

5. The minimal propagation loss, electro-optic coefficient maximizing electrically controlled polymer-based optical signal modulation and switching device requiring minimal operating voltage of claim 2, wherein said optical signal propagation loss is less than 1 decibel per centimeter of device length.

6. The minimal propagation loss, electro-optic coefficient maximizing electrically controlled polymer-based optical signal modulation and switching device requiring minimal operating voltage of claim 2, wherein total poling voltage is between 100 and 450 volts and between 100 and 150 volts per micron across the non-linear electro-optic polymer core layer.

7. The minimal propagation loss, electro-optic coefficient maximizing electrically controlled polymer-based optical signal modulation and switching device requiring minimal operating voltage of claim 2, wherein said modulation and switching device has a length of less than 3 centimeters.

8. The minimal propagation loss, electro-optic coefficient maximizing electrically controlled polymer-based optical signal modulation and switching device requiring minimal operating voltage of claim 1, wherein said first and second optically transparent electrically conductive charge sheet poling electrode layers comprise first and second electrically passive polymer layers that confine the optical signal within the non-linear electro-optic polymer core layer for minimum optical propagation loss.

9. The minimal propagation loss, electro-optic coefficient maximizing electrically controlled polymer-based optical signal modulation and switching device requiring minimal operating voltage of claim 1, wherein said first and second electrically passive polymer layers that confine the optical signal within the non-linear electro-optic polymer core layer for minimum optical propagation loss comprise electrodes for said modulation and switching device operation.

10. A method for fabricating a non-linear electro-optic polymer based optical signal modulation and switching device comprising the steps of:
    depositing a first metal layer onto a substrate;
    forming a first electrically passive polymer cladding layer onto said metal layer;
    forming a first optically transparent electrically conductive charge sheet poling electrode layer onto said electrically passive polymer cladding layer;
    forming a non-linear electro-optic polymer core layer onto said first electrically passive polymer cladding layer;
    forming a second optically transparent electrically conductive charge sheet poling electrode layer onto said non-linear electro-optic polymer core layer, forming a second electrically passive polymer cladding layer onto said second optically transparent electrically conductive charge sheet poling electrode layer; and
    depositing a second metal layer onto said second electrically passive polymer cladding layer.

11. The method for fabricating a non-linear electro-optic polymer based optical signal modulation and switching device of claim 10, including the step of providing non-linear properties in said non-linear electro-optic polymer core layer by applying heat and DC voltage thereto.

12. The method for fabricating a non-linear electro-optic polymer based optical signal modulation and switching device of claim 11, wherein said forming steps include the step of spin coating.

13. The method for fabricating a non-line electro-optic polymer based optical signal modulation and switching device of claim 12, wherein said steps for fabricating said first and second optically transparent electrically conductive charge sheet poling electrode layers include plasma deposition and spin coating of metal, ferroelectric, semiconductor and conductive polymer material.

14. The method for fabricating a non-line electro-optic polymer based optical signal modulation and switching device of claim 12, wherein said step of spin coating a non-linear electro-optic polymer core layer achieves a 1 to 3 micron polymer core layer.

15. The method for fabricating a non-linear electro-optic polymer based optical signal modulation and switching device of claim 11, wherein said total DC poling voltage is 100 to 450 volts or 100 to 150 volts per micron across the non-linear electro-optic polymer core layer.

16. The method for fabricating a non-linear electro-optic polymer based optical signal modulation and switching device of claim 10, wherein said first and second optically transparent electrically conductive charge sheet poling electrode layers each achieve an optically transparent electrically conductive charge sheet poling electrode layer of less than 100 nanometer thickness.

17. A The method for fabricating a non-linear electro-optic polymer based optical signal modulation and switching device of claim 10, including the step of etching wave guides in the desired shape of said modulation or switching device using photolithography.

18. An electrically controlled, non-linear electro-optic polymer material-based method for modulation and switching an optical signal comprising the steps of:

transmitting an optical signal through a plurality of waveguides integral with a polymer core layer; and applying an electric poling field to said non-linear electro-optic polymer core layer, said electric field commencing at a first metal electrode layer adjacent to a first electrically passive polymer cladding layer adjacent through a first electrically conductive via to a first optically transparent electrically conductive charge sheet polymer electrode layer adjacent to the first lateral surface of said non-linear electro-optic polymer core layer adjacent to a second optically transparent electrically conductive charge sheet polymer electrode layer adjacent to the second electrically passive polymer cladding layer and terminating to a second metal electrode layer through a second electrically conductive via, said electric poling field predictably poling the non-linear electro-optic polymer core to its maximum non-linearity.

19. The electrically controlled, non-linear electro-optic polymer based method for modulation or switching an optical signal of claim 18, wherein said step of applying an electric poling field to said non-linear electro-optic polymer core layer comprises supplying a first electrical potential to a first metallic layer communicating with said first electrically passive polymer cladding layer and first optically transparent electrically conductive charge sheet poling electrode layer through a first electrically conductive via and a non-linear electro-optic polymer core layer and a second optically transparent electrically conductive charge sheet poling electrode layer and a second electrically passive polymer cladding layer to a second metallic layer through a second electrically conductive via.

* * * * *

UNITED STATES PATENT AND TRADEMARK OFFICE
CERTIFICATE OF CORRECTION

PATENT NO. : 6,782,166 B1
DATED : August 24, 2004
INVENTOR(S) : James G. Grote et al.

It is certified that error appears in the above-identified patent and that said Letters Patent is hereby corrected as shown below:

Title page,
Item [57], ABSTRACT, "sandwich" should read -- sandwiched --.

Column 2,
Line 62, "cl adding" should read -- cladding --.

Column 8,
Line 53, "forming" should begin a new paragraph.

Column 9,
Lines 1 and 8, "non-line" should read -- non-linear --.

Signed and Sealed this

Thirtieth Day of November, 2004

JON W. DUDAS
*Director of the United States Patent and Trademark Office*